United States Patent
Nakagawa

(10) Patent No.: US 6,939,910 B2
(45) Date of Patent: Sep. 6, 2005

(54) RUBBER COMPOSITION

(75) Inventor: Ryuji Nakagawa, Fairlawn, OH (US)

(73) Assignee: Bridgestone Corporation, Tokyo (JP)

( * ) Notice: Subject to any disclaimer, the term of this patent is extended or adjusted under 35 U.S.C. 154(b) by 7 days.

(21) Appl. No.: 10/398,611

(22) PCT Filed: Dec. 28, 2000

(86) PCT No.: PCT/JP01/11626
§ 371 (c)(1),
(2), (4) Date: Aug. 27, 2003

(87) PCT Pub. No.: WO03/060004
PCT Pub. Date: Jul. 24, 2003

(65) Prior Publication Data
US 2004/0030037 A1 Feb. 12, 2004

(51) Int. Cl.[7] ................................. C08L 5/01
(52) U.S. Cl. ................... 524/474; 524/490; 524/575
(58) Field of Search ...................... 524/474, 490, 524/575

(56) References Cited

U.S. PATENT DOCUMENTS 4,250,067 A * 2/1981 Bresson ................... 524/71
5,504,135 A * 4/1996 Ardrizzi et al. ............. 524/484
5,998,513 A * 12/1999 Hashimoto .................. 524/64
6,103,808 A    8/2000 Hasimoto
6,822,043 B2 * 11/2004 Sohnen et al. .............. 524/592

FOREIGN PATENT DOCUMENTS

JP        01138248 A    5/1989

* cited by examiner

Primary Examiner—David W. Wu
Assistant Examiner—Rip A. Lee
(74) Attorney, Agent, or Firm—Sughrue Mion, PLLC

(57) ABSTRACT

This invention provides a rubber composition comprising: a softening agent including a hydrogenated naphthenic oil of which an extract quantity of dimethylsulfoxide (DMSO) by IP 346 method is controlled to less than 3% by weight and blending at least one selected from a group of (1) a styrene-butadiene copolymer rubber with a bond styrene quantity in molecular of from 10% by weight to 60% by weight and with a vinyl bond quantity of the butadiene part of from 10% to 80% and (2) a butadiene rubber with a cis bond quantity of at least 30%. The rubber composition is superior in fracture characteristics, loss characteristic and wear resistance, and it is applicable to various rubber products, a pneumatic tire and, in particular, a tire tread.

10 Claims, No Drawings

RUBBER COMPOSITION

TECHNICAL FIELD

This invention relates to a rubber composition. In detail, this invention relates to a rubber composition comprising a softening agent containing hydrogenated naphthenic oils with less than 3% by weight of dimethylsulfoxide (DMSO) extract and a synthetic rubber having specified microstructure, and more particularly, relates to a rubber composition used for a tire tread.

BACKGROUND ART

As a softening agent for rubber composition, conventionally a high aromatic oil has been broadly employed as a process oil in a field of rubber composition for a pneumatic tire or others in a view point of applying high loss performance (high heat generating property) or affinity with rubber. On the other hand, in late years, instead of the aromatic oil, a process oil including less than 3% by weight of polycyclic aromatic compounds (PCA) component called as Treated Distilled Aromatic Extracts (T-DAE), Mild Extracted Solvates (MES) or so became to be employed.

Such a substitute oil, however, has lower softening point than conventional aromatic oils, and in replacing simply, temperature dependency of viscoelasticity characteristic of the rubber composition (G', G", tan δ) tends to shift toward low temperature side. Therefore, there was a problem that a wet skid resistant performance in an actual tire performance degrades because tan δ value at 0° C. as an indicator of wet skid performance decreases.

SUMMARY OF THE INVENTION

Under such situation, an object of this invention is to provide a rubber composition particularly for the use to pneumatic tire comprising a specific softening agent containing less than 3% by weight of polycyclic aromatic compounds (PCA) component and besides, with equivalent or superior rupture strength (fracture property) and good loss characteristic (dynamic loss property) as compared with the aromatic oils.

In order to overcome the foregoing problem, a rubber composition blending hydrogenated naphthenic oil of which PCA component is controlled to less than 3% by weight with elevated temperature & elevated pressure hydrogenation purification technology having synthetic rubber of various microstructures was provided, and the physical property was evaluated. As a result, it was found effective to blend a softening agent including specific hydrogenated naphthenic oil with a synthetic rubber having specific microstructure, and this invention was completed.

In other words, this invention provides a rubber composition comprising: a softening agent including a hydrogenated naphthenic oil of which an extract quantity of dimethylsulfoxide (DMSO) by IP 346 method is controlled to less than 3% by weight and at least one selected from a groups of (1) a styrene-butadiene copolymer rubber with a bond styrene quantity in molecular of from 10% by weight to 60% by weight and with a vinyl bond quantity of the butadiene part of from 10% to 80% and (2) a butadiene rubber with a cis bond quantity of at least 30%. In addition, this invention provides a tire tread and a pneumatic tire with the use of the foregoing rubber composition.

THE BEST MODE FOR CARRYING OUT THE INVENTION

In the rubber composition of this invention, styrene-butadiene copolymer rubber (SBR) having a specified microstructure and/or a butadiene rubber (BR) is used as the rubber component blended with the aforementioned particular softening agent. Regarding the SBR, a polymer of which a styrene bond quantity is from 10% by weight to 60% by weight, desirably from 20% by weight to 50% by weight and more desirably from 30% by weight to 45% by weight and a vinyl bond quantity in butadiene part is from 10% to 80%, desirably from 10% to 65% is employed. Further, regarding the BR, a polymer of which a cis bond quantity is at least 30%, desirably at least 60% and more desirably at least 90% is employed. A manufacturing method of these SBR and BR is not particularly limited and either an emulsion polymerization method or a solution polymerization method is adopted. Considering a balance of various performance as a tire tread, however, SBR produced by the emulsion polymerization method is desirable.

As a rubber component used for the rubber composition of this invention, the aforesaid SBR or BR can be employed by blending a natural rubber or other dienic rubber, etc. The amount of the SBR or BR in total rubber component is preferably at least 50% by weight, more preferably at least 80% by weight and the most preferably 100% by weight because the more the amount, the more enough effect is obtained.

Regarding the softening agent used in this invention, it is required to contain a hydrogenated naphthenic oil of which an extract quantity of dimethylsulfoxide (DMSO) by IP 346 method is controlled to less than 3% by weight. Such an oil can be obtained by preparingly hydrofining a naphthenic oil with elevated temperature & elevated pressure hydrogenation purification technology, for example. In the foregoing description, IP 346 regulation requires that the amount of PCA component (that is, the extract quantity of dimethylsulfoxide (DMSO) by IP 346 method) must be less than 3% by weight.

Regarding the kinetic viscosity at 100° C. of the softening agent used in this invention, it is desirable to be up to 350 mm$^2$/second, more desirable to be up to 200 mm$^2$/second and the most desirable to be up to 150 mm$^2$/second from the viewpoint of oil extension to synthetic rubber, workability for blending with the rubber composition (easiness of introduction to a kneading machine).

In addition, an asphalt may be included among the softening agent in this invention. An asphaltene component in the asphalt is desirable to be up to 5% by weight considering miscibility with the synthetic rubber employed or an effect as the softening agent. It is desirable that such an asphalt is particularly a naphthenic straight asphalt and that kinetic viscosity at 120° C. of the asphalt is up to 300 mm$^2$/second.

In a softening agent containing asphalt component in this invention, a blending weight ratio of the hydrogenated naphthenic oil and the asphalt under the expression of (the hydrogenated naphthenic oil/the asphalt) is desirable to be from 95/5 to 5/95 and more desirable to be from 70/30 to 20/80. Too much asphalt may induce problems in cryogenic temperature characteristic, etc. of blended rubber.

Preparation method for the softening agent containing asphalt component is not particularly limited, and the softening agent prepared either by mixing the asphalt to hydrogenated naphthenic oil in advance or by adding major component of the asphalt in appropriate ratio among the hydrogenated naphthalenic oil during conventional purification process of hydrogenated naphthenic oil may be employed. However, the preparation method for the softening agent dissolving the asphalt in the hydrogenated naphthenic oil is desirable in the viewpoint of easiness of the preparation or economic reason. These preparation methods for the softening agent containing the asphalt component are applicable for the case where the softening agent is employed either for an extender oil or for a blending oil.

In addition, the hydrogenated naphthenic oil has desirably at least 30% CN of naphthenic hydrocarbon content measured in accordance with ASTM D2140 (in other word, popular name of ring analysis). The hydrogenated naphthenic oil with such a characteristic having less than 3 weight % of PCA content is available, for example, as SNH8, SNH46, SNH220, and SNH440 (each is a trademark) available from Sankyo Petrochemical Co., Ltd.

The softening agent containing the asphalt of this invention may be added during the mixing process of the rubber components (including the production of masterbatch) or may be added as an extender oil in the preparation of a synthetic rubber.

The addition amount of the softening agent to the rubber composition of this invention is preferably 1 to 200 parts by weight, more preferably 3 to 150 parts by weight and the most preferably in particular 5 to 100 parts by weight per 100 parts by weight of the rubber component in view of the loss property, fracturing property and wear resistance. The foregoing addition amount of the softening agent means total amount of both of the so-called extender oil and blending oil.

The addition amount of the softening agent, when used as an extender oil in the production of synthetic rubber, is preferably 5 to 150 parts by weight, more preferably 7 to 100 parts by weight and the most preferably in particular 10 to 50 parts by weight per 100 parts by weight of the rubber component (base polymer) being extended. In addition, the additional amount of the softening agent, when used as a blending oil in the mixing process of the rubber composition, is preferably 1 to 70 parts by weight and more preferably 5 to 50 parts by weight per 100 parts by weight of the rubber component. Further, the softening agent can be added simultaneously with other fillers or chemicals during its blending.

A portion of the softening agent containing asphalt that is used in the rubber composition of this invention may be replaced by another conventionally used softening agent. When another softening agent is used, it is preferable that the total blending amount of the softening agent is within the foregoing range. In order to sufficiently exhibit the effect of this invention, the softening agent of this invention is preferably used in an amount of at least 30% by weight of the total amount of the softening agents including asphaltene-containing softening agent and another softening agent.

The rubber composition of this invention may contain a reinforcing filler such as carbon black, silica, aluminum hydroxide, etc., in an amount of 20 to 150 parts by weight, preferably 25 to 120 parts by weight and more preferably 30 to 105 parts by weight per 100 parts by weight of the rubber component.

There is no limitation in particular as the carbon black, and any carbon black conventionally used as the reinforcing filler for rubber can be optionally selected and employed. Typical examples of the carbon black include FEF, SRF, HAF, ISAF, SAF, etc., and among these, HAF, ISAF, and SAF are desirable because they are particularly superior in wear resistance.

In addition, there is no limitation in particular as the silica, and any silica conventionally used as the reinforcing filler for rubber can be optionally selected and employed. Typical examples of the silica include wet type silica (hydrate silicic acid), dry type silica (silicic acid anhydride), calcium silicate, aluminum silicate, etc., and among these, wet type silica is desirable from the viewpoint of its favorable performance.

Further, there is no limitation in particular as the aluminum hydroxide, and the aluminum hydroxides with mean particle size of 10 $\mu$m or smaller having the surface processed by surface preparation agent is desirably employed. By processing the surface of the aluminum hydroxide particles with the surface preparation agent, the particles particularly with large diameter among them are prevented from working as breaking kernel and the aggregation between the particles themselves is also prevented thereby exhibiting the effect of inhibiting that the aluminum hydroxide aggregate becomes breaking kernel. There is no limitation in particular as the surface preparation agent, and although any surface preparation agent among various conventional agents publicly known can be optionally selected and employed, silane-based coupling agent and stearic acid are preferable and in particular, silane-based coupling agent is appropriate.

Furthermore, as a cross-linking agent used for rubber composition of this invention, any cross-linking agent generally used in the rubber industry such as organic peroxide, sulfur, and an organic sulfur compound can be employed. When sulfur or an organic sulfur compound is employed as the cross-linking agent, a vulcanization accelerator generally used in the rubber industry can be used in the ordinary manner.

The rubber composition of this invention may further contain inorganic fillers generally used in the rubber industry in an amount of 5 to 200 parts by weight, preferably 25 to 120 parts by weight and more preferably 30 to 105 parts by weight per 100 parts by weight of the rubber component in addition to the foregoing components. The rubber composition of this invention may further contain other ingredients generally used in the rubber industry such as antioxidants or vulcanization auxiliary agents in addition to the foregoing components.

This invention will be described in further detail with reference to Examples, which does not limit the scope of this invention.

Properties of the asphalt, the softening agents, the hydrogenated naphthenic oil and rubber compositions were measured in accordance with the following methods.

<Microstructure of Polymer>

A quantity of vinyl bond in conjugated diene unit (a quantity of 1,2 bond of butadiene part) was obtained by an infrared method. In addition, a quantity of styrene bond in the polymer was obtained by 1H-NMR method.

<Physical Property Evaluation of the Asphalt and the Softening Agent>

(1) Properties of the Asphalt (a) An Asphaltene Component

The asphaltene component was quantitatively analyzed based on a chemical composition analysis measured in accordance with JPI method (Nippon Petroleum Institute method).

(b) Kinetic Viscosity

The kinetic viscosity was measured at 120° C. in accordance with JIS K2283-1993.

(2) Properties of the Hydrogenated Naphthenic Oil (a) Measurement of Content of Various Carbon by Ring Analysis An aromatic hydrocarbon content (% CA), a naphthenic hydrocarbon content (% CN) and a paraffinic hydrocarbon content (% CP) each in terms of% by weight in the softening agent were measured in accordance with ASTM D-2140.

(b) Kinetic Viscosity

The kinetic viscosity was measured at 100° C. in accordance with JIS K2283-1993.

(c) Aniline Point

The aniline point was measured in accordance with JIS K2256-1985.

(d) PCA (Polycyclic Aromatic Compounds)

PCA was represented by the amount (% by weight) of DMSO extract in accordance with the method of IP 346.

<Evaluation of Vulcanized Rubber Composition>

(1) Fracturing Properties

A test piece was prepared by punching a sheet (150 mm×150 mm×2 mm) of vulcanized rubber using a blade of JIS No. 3 in accordance of JIS K6301-1995. A breaking strength of the test piece at 25° C. was measured by means of a tensile testing machine (STROGRAPH AR-1 produced by Toyo Seiki Co., Ltd.) and expressed as an index. The larger the index, the better the fracturing properties.

(2) Loss Property (Dynamic Loss Property)

The values of tan δ of a vulcanized rubber sheet (5 mm×45 mm×2 mm) was measured under conditions of 5% distortion, frequency of 15 Hz at 0° C. and at 60° C. using a viscoelastmeter (RHEOGRAPHSOLID L-1R produced by TOYO SEIKI Co., Ltd.).

The results of the measurement were evaluated by the following ratings:

a) Regarding the tan δ at 0° C., the measured value was expressed as an index without conducting any calculation. The larger the index, the better the wet skid property.

b) Regarding the tan δ at 60° C., an inverse value of the measured value was expressed as an index. The larger the index, the better the low fuel consumption property.

(3) Wear Resistance

A wear loss at the slip ratio of 60% was measured with the Lambourne type wear tester, an inverse value of the measured value was expressed as an index. The larger the index, the better the wear resistance. Next, softening agents, specimens for feasibility studies of new rubbers, oil extended synthetic rubbers and test pieces of vulcanized rubber in EXAMPLES and COMPARATIVE EXAMPLES of this invention were prepared in the manner described in (A) to (D) below.

(A) Preparation of Softening Agents

Hydrogenated naphthenic oils shown in Table 1 and heated to 70° C. beforehand were precisely weighed in specified amounts. Naphthenic straight asphalts shown in Table 2 and heated to 85° C. in order to reduce its viscosity beforehand were precisely weighed in specified amounts. Then, while keeping it at 70° C., the straight asphalts were added to the hydrogenated naphthenic oils. Thereafter, the mixture was continuously stirred for 5 minutes to prepare various softening agents including asphalt. Further, regarding each softening agent used in EXAMPLES and COMPARATIVE EXAMPLES, PCA component (a quantity of DMSO extract) was measured.

TABLE 1

|  |  | Hydrogenated Naphthenic oil | | | | Aromatic Oil |
|---|---|---|---|---|---|---|
|  |  | A | B | C | D | E |
| Ring Analysis | % CA | 13.0 | 15.5 | 14.0 | 24.0 | 44.0 |
| (ASTM D2140) | % CN | 50.0 | 45.0 | 27.0 | 27.0 | 28.0 |
|  | % CP | 37.0 | 39.5 | 59.0 | 49.0 | 28.0 |
| Dynamic Viscosity @100° C. | (mm²/second) | 5.31 | 12.1 | 17.00 | 28.0 | 24.00 |
| Aniline Point | (° C.) | 74.2 | 82.6 | 90.0 | 80.0 | 30.0 |
| PCA (% by weight) |  | 2.6 | 2.6 | 1.8 | 2.5 | 21.4 |

Note:
A = SNH46 (Trademark, Available from Sankyo Petrochemical Co., Ltd.)
B = SNH220 (Trademark, Available from Sankyo Petrochemical Co., Ltd.)

TABLE 2

| Naphthenic Straight Asphalt | |
|---|---|
| Asphalten (% by weight) | 0.7 |
| Dynamic Viscosity @120° C. (mm²/second) | 120 |

(B) Production of Feasibility Study Rubber (Base Polymer)

Production Example 1 (SBR-1)

After purging the content of a pressure proof sealed glass vessel having a capacity of 1 liter with nitrogen, 256 g of cyclohexane, 21 g of styrene and 39 g of butadiene were introduced into the vessel. Then, 0.11 millimole of ditetrahydrofuryl propane and 0.36 millimole of normal butyl-lithium (n-BuLi) were added and polymerization reaction at 50° C. was continued for 3 hours. After 3 hours, 0.5 milliliter of 2-propanol was added and the reaction was discontinued. A solution dissolving 0.5 g of 2,6-di-t-butyl-p-creosol in 5 milliliter of isopropanol was added as an antioxidant to the foregoing polymer solution. A microstructure of the polymer was analyzed about one part of the obtained polymer solution. The results are shown in Table 3.

Production Example 2 (SBR-2)

After purging the content of a pressure proof sealed glass vessel having a capacity of 1 liter with nitrogen, 289 g of cyclohexane, 3 g of styrene and 57 g of butadiene were introduced into the vessel. Then, 0.55 millimole of ditetrahydrofuryl propane and 0.36 millimole of normal butyl-lithium (n-BuLi) were added and polymerization reaction at 50° C. was continued for 3 hours. After 3 hours, 0.5 milliliter of 2-propanol was added and the reaction was discontinued. A solution dissolving 0.5 g of 2,6-di-t-butyl-p-creosol in 5 milliliter of isopropanol was added as an antioxidant to the foregoing polymer solution. A microstructure of the polymer was analyzed about one part of the obtained polymer solution. The results are shown in Table 3.

Production Example 3 (BR-1)

In a beaker with a capacity of 5 liter, 3 liter of cyclohexane and 500 g of oil extended high cis polybutadiene "BR31" (trademark; available from JSR Corp.) were introduced and agitated for dissolution. While agitating, this solution was dripped to another beaker with a capacity of 5 liter containing 2 liter of 2-propanol expecting reprecipitation. After vacuum heat drying the polymer from which the extender oil was removed in this way, it was remelted with 3 liter of cyclohexane in a beaker with a capacity of 5 liter. After full dissolution, a solution dissolving 0.5 g of 2,6-di-t-butyl-p-creosol in 5 milliliter of isopropanol was added. A microstructure of the polymer was analyzed about one part of the obtained polymer solution. The results are shown in Table 3.

Production Example 4 (BR-2)

A butadiene rubber having 60% of cis bond quantity shown in Table 3 was synthesized by conventional method.

Production Example 5 (BR-3)

Production example 5 was conducted in the same way as Production example 3, with the exception of using an oil extended polybutadiene "BUDENE1255" (trademark; available from Goodyear Co., Ltd.) instead of the oil extended high cis polybutadiene "BR 31". A microstructure of the polymer was analyzed about one part of the obtained polymer solution. The results are shown in Table 3.

Production Example 6 (SBR-3)

Production example 6 was conducted in the same way as Production example 3, with the exception of using an oil extended rubber of emulsion polymerization styrene-butadiene copolymer rubber "SBR 1712" (trademark; available from JSR Co., Ltd.) instead of the oil extended high cis polybutadiene "BR 31". A microstructure of the polymer was analyzed about one part of the obtained polymer solution. The results are shown in Table 3.

TABLE 3

| | Number of Production Example | | |
|---|---|---|---|
| | 1 | 2 | 6 |
| Styrene-Butadien Copolymer Rubber (SBR) | SBR-1 | SBR-2 | SBR-3 |
| Amount of bond Styrene (% by weight) | 35 | 5 | 23.5 |
| Amount of Vinyl Bond (% among Butadiene) | 23 | 75 | 16 |
| Notes | | | for Com. EX. |

| | Number of Production Example | | |
|---|---|---|---|
| | 3 | 4 | 5 |
| Butadiene Rubber (BR) | BR-1 | BR-2 | BR-3 |
| Amount of Cis Bond (% among Butadiene) | 95 | 60 | 20 |
| Notes | | | for Com. EX. |

Note:
In Table 3, "Com. EX." is an abbreviation of "COMPARATIVE EXAMPLE".

(C) Preparation of Oil Extended Rubber for Feasibility Study

A softening agent with a specified composition was added up to 37.5 parts by weight to 100 parts by weight of the polymer of SBR or BR polymer solution obtained after discontinuing polymerization or after dissolution of reprecipitated materials in Production examples 1 to 6, and the solution was agitated for 30 minutes at 50° C. Various kinds of oil extended rubbers were obtained after vacuum heat drying the solution. With regards to the oil extended rubber containing the softening agent provided in this way, a description with "oil ext." in a column of Softening Agent Addition Method is done in Tables 5, 6, 8, 10 and 12.

(D) Preparation of Vulcanized Rubber Test Pieces

Components for a masterbatch with the formulation shown in Tables 4, 7, 9 and 11 were mixed together in a kneader with rollers having a surface temperature of 70° C. and the mixed product was further finally kneaded and was formed into a sheet. The sheet thus obtained was charged into a suitable molding die at 160° C. under conditions of a pressure of 30 kg/cm$^2$, 15 minutes of heating. The vulcanized product was released from the molding die and test pieces having a predetermined size were prepared. With regards to the oil extended rubber containing the softening agent provided adding the softening agent in the step of kneading the masterbatch, a description with "knead" in the column of Softening Agent Addition Method is done in Tables 5, 6, and 8.

EXAMPLES 1 TO 12, COMPARATIVE EXAMPLES 1 TO 12 AND REFERENCE EXAMPLES 1 AND 2

In accordance with formulation shown in Table 4 below, a carbon black blended SBR or a BR based vulcanized rubber composition was prepared.

TABLE 4

| Mixed Stage | Blending Contents | Parts by wt. | Blended Agent | Supplier |
|---|---|---|---|---|
| Masterbatch Kneading | SBR or BR | 100 | | Base Polymer for feasibility study rubber |
| | N220 Carbon | 75 | Tokai Siest 6 | Tokai Carbon Co., Ltd. |
| | Softening Agent | 37.5 | | Softening Agent as shown in Table 5 |
| | Stearic Acid | 1.5 | BR-Stearic Acid | Nippon Oils & Fats Co., Ltd. |
| Final Kneading | Zinc Oxide | 3 | Zinc White No. 1 | Hakusui Chemicals Inc. |
| | Sulfur | 1.8 | Sulfur | Karuizawa Refinement Co., Ltd. |
| | Vulcanization accelerator 1 | 1.5 | NOCCELER DM | Ouchi Shinko Chemical Co., Ltd |
| | Vulcanization accelerator 2 | 0.8 | NOCCELER DPG | Ouchi Shinko Chemical Co., Ltd |

Fracture properties, loss properties and wear resistance regarding the rubber composition were evaluated by the foregoing evaluation methods. The physical property values of the rubber compositions in EXAMPLES 1 to 12 were expressed by the index values making the rubber compositions in the corresponding numbers among COMPARATIVE EXAMPLES 1 to 12 as the controls and calculating with fixing the physical property values of the controls as 100. The evaluation results are shown in Table 5 (carbon black blended SBR) and Table 6 (carbon black blended BR). In these Tables, "phr" expresses number of part by weight on the assumption that the polymer component corresponds to 100 parts by weight.

TABLE 5-1

| Carbon Black Blended SBR | | | COM. EX. 1 | EX. 1 | REF. EX. 1 | COM. EX. 2 | EX. 2 | COM. EX. 3 | EX. 3 |
|---|---|---|---|---|---|---|---|---|---|
| Composition of Softening Agent | Hydrogenated Naphthenic Oil | SNH46 (phr) | — | — | — | — | — | — | — |
| | | SNH220 (phr) | 18.75 | 18.75 | — | 37.5 | 37.5 | 37.5 | 37.5 |
| | | Aromatic Oil (phr) | — | — | 37.5 | — | — | — | — |
| | | Asphalt as shown in Table 2 (phr) | 18.75 | 18.75 | — | 0 | 0 | 0 | 0 |
| Base Polymer | Production Example 1 | SBR-1 (phr) | — | 100 | 100 | — | 100 | — | 100 |
| | Production Example 2 | SBR-2 (phr) | 100 | — | — | 100 | — | 100 | — |
| | Softening Agent Addition Method | | oil ext. | oil ext. | oil ext. | oil ext. | oil ext. | knead | knead |
| PCA Component in the Softening Agent (DMSO elusion, wt %) | | | 1.3 | 1.3 | 15 | 0.1 | 0.1 | 0.1 | 0.1 |
| Vulcanization Rubber | Fracturing Properties | Fracturing Strength @25° C. (Index) | 100 | 105 | 105 | 100 | 110 | 100 | 109 |
| | Loss Property | tan δ @0° C. (Index) | 100 | 110 | 109 | 100 | 105 | 100 | 105 |
| | | tan δ @60° C. (Index) | 100 | 100 | 100 | 100 | 100 | 100 | 100 |
| | Wear Resistance | Lambourne Antiwear Resistance (Index) | 100 | 110 | 110 | 100 | 105 | 100 | 106 |

TABLE 5-2

| Carbon Black Blended SBR | | | COM. EX. 4 | EX. 4 | COM. EX. 5 | EX. 5 | COM. EX. 1 | EX. 1 | COM. EX. 6 | EX. 6 |
|---|---|---|---|---|---|---|---|---|---|---|
| Composition of Softening Agent | Hydrogenated Naphthenic Oil | SNH46 (phr) | 18.75 | 18.75 | 18.75 | 18.75 | — | — | — | — |
| | | SNH220 (phr) | — | — | — | — | 18.75 | 18.75 | 1.5 (4%) | 1.5 (4%) |
| | | Aromatic Oil (phr) | — | — | — | — | — | — | — | — |
| | | Asphalt as shown in Table 2 (phr) | 18.75 | 18.75 | 18.75 | 18.75 | 18.75 | 18.75 | 36 (96%) | 36 (96%) |
| Base Polymer | Production Example 1 | SBR-1 (phr) | — | 100 | — | 100 | — | 100 | — | 100 |
| | Production Example 2 | SBR-2 (phr) | 100 | — | 100 | — | 100 | — | 100 | — |
| | Softening Agent Addition Method | | oil ext. | oil ext. | knead | knead | oil ext. | oil ext. | oil ext. | oil ext. |
| PCA Component in the Softening Agent (DMSO elusion, wt %) | | | 1.3 | 1.3 | 1.3 | 1.3 | 1.3 | 1.3 | 0.1 | 0.1 |
| Vulcanization Rubber | Fracturing Properties | Fracturing Strength @25° C. (Index) | 100 | 108 | 100 | 107 | 100 | 105 | 100 | 100 |
| | Loss Property | tan δ @0° C. (Index) | 100 | 112 | 100 | 110 | 100 | 110 | 100 | 105 |
| | | tan δ @60° C. (Index) | 100 | 100 | 100 | 100 | 100 | 100 | 100 | 99 |
| | Wear Resistance | Lambourne Antiwear Resistance (Index) | 100 | 105 | 100 | 104 | 100 | 110 | 100 | 99 |

TABLE 6-1

| Carbon Black Blended SBR | | | COM. EX. 7 | EX. 7-1 | EX. 7-2 | REF. EX. 2 | COM. EX. 8 | EX. 8 | COM. EX. 9 | EX. 9 |
|---|---|---|---|---|---|---|---|---|---|---|
| Composition of Softening Agent | Hydrogenated Naphthenic Oil | SNH46 (phr) | — | — | — | — | 37.5 | 37.5 | 37.5 | 37.5 |
| | | SNH220 (phr) | 18.75 | 18.75 | 18.75 | — | — | — | — | — |
| | | Aromatic Oil (phr) | — | — | — | 37.5 | — | — | — | — |
| | | Asphalt as shown in Table 2 (phr) | 18.75 | 18.75 | 18.75 | — | 0 | 0 | 0 | 0 |

TABLE 6-1-continued

|  |  |  | COM. EX. 7 | EX. 7-1 | EX. 7-2 | REF. EX. 2 | COM. EX. 8 | EX. 8 | COM. EX. 9 | EX. 9 |
|---|---|---|---|---|---|---|---|---|---|---|
| Base Polymer | Production Example 3 | BR-1 (phr) | — | — | 100 | 100 | — | 100 | — | 100 |
|  | Production Example 4 | BR-2 (phr) | — | 100 | — | — | — | — | — | — |
|  | Production Example 5 | BR-3 (phr) | 100 | — | — | — | 100 | — | 100 | — |
|  | Softening Agent Addition Method |  | oil ext. | oil ext. | oil ext. | oil ext. | oil ext. | oil ext. | knead | knead |
| PCA Component in the Softening Agent (DMSO elusion, wt %) |  |  | 1.3 | 1.3 | 3 | 15 | 0.1 | 0.1 | 0.1 | 0.1 |
| Vulcanization Rubber | Fracturing Properties | Fracturing Strength @25° C. (Index) | 100 | 105 | 110 | 109 | 100 | 106 | 100 | 105 |
|  | Loss Property | tan δ @0° C. (Index) | 100 | 101 | 103 | 103 | 100 | 100 | 100 | 100 |
|  |  | tan δ @60° C. (Index) | 100 | 104 | 108 | 107 | 100 | 110 | 100 | 108 |
|  | Wear Resistance | Lambourne Antiwear Resistance (Index) | 100 | 105 | 115 | 117 | 100 | 110 | 100 | 109 |

TABLE 6-2

|  |  |  | COM. EX. 10 | EX. 10 | COM. EX. 7 | EX. 7-2 | COM. EX. 11 | EX. 11 | COM. EX. 12 | EX. 12 |
|---|---|---|---|---|---|---|---|---|---|---|
| Composition of Softening Agent | Hydrogenated Naphthenic Oil | SNH46 (phr) | 18.75 | 18.75 | — | — | — | — | 1.5 (4%) | 1.5 (4%) |
|  |  | SNH220 (phr) | — | — | 18.75 | 18.75 | 18.75 | 18.75 | — | — |
|  |  | Aromatic Oil (phr) | — | — | — | — | — | — | — | — |
|  | Asphalt as shown in Table 2 (phr) |  | 18.75 | 18.75 | 18.75 | 18.75 | 18.75 | 18.75 | 36 (96%) | 36 (96%) |
| Base Polymer | Production Example 3 | BR-1 (phr) | — | 100 | — | 100 | — | 100 | — | 100 |
|  | Production Example 5 | BR-3 (phr) | 100 | — | 100 | — | 100 | — | 100 | — |
|  | Softening Agent Addition Method |  | oil ext. | oil ext. | oil ext. | oil ext. | knead | knead | oil ext. | oil ext. |
| PCA Component in the Softening Agent (DMSO elusion, wt %) |  |  | 1.3 | 1.3 | 1.3 | 1.3 | 1.3 | 1.3 | 0.1 | 0.1 |
| Vulcanization Rubber | Fracturing Properties | Fracturing Strength @25° C. (Index) | 100 | 110 | 100 | 110 | 100 | 109 | 100 | 104 |
|  | Loss Property | tan δ @0° C. (Index) | 100 | 108 | 100 | 103 | 100 | 104 | 100 | 98 |
|  |  | tan δ @60° C. (Index) | 100 | 100 | 100 | 108 | 100 | 108 | 100 | 104 |
|  | Wear Resistance | Lambourne Antiwear Resistance (Index) | 100 | 110 | 100 | 115 | 100 | 114 | 100 | 105 |

According to the result shown in the Tables, the rubber compositions of this invention are particularly superior in all of the fracture properties, the loss properties (at least one characteristic of tangent δ at 0° C. and tangent δ at 60° C.) and the wear resistance particularly when the weight ratio of the (hydrogenated naphthenic oil)/(asphalt) is from 95/5 to 5/95. In addition, by comparing between EXAMPLE 2 and EXAMPLE 3, EXAMPLE 4 and EXAMPLE 5, EXAMPLE 8 and EXAMPLE 9, EXAMPLE 7 and EXAMPLE 1 1 respectively, it is found that the effect of this invention is obtained either by adding the softening agent to the oil extended rubber or by adding the softening agent in the step of kneading the rubber.

Further, by comparing EXAMPLE 1 and REFERENCE EXAMPLE 1, EXAMPLE 7-2 and REFERENCE EXAMPLE 2 respectively, it is found that the rubber composition containing carbon black according to this invention shows superior physical property equivalent to or better than the conventional rubber composition using an aromatic oil.

EXAMPLES 13 TO 18, COMPARATIVE EXAMPLES 13 TO 18 AND REFERENCE EXAMPLE 3

In accordance with formulations shown in Table 7 below, a SBR-based vulcanized rubber composition containing silica and carbon black in combination was prepared.

TABLE 7

| Mixed Stage | Blending Contents | Parts by wt. | Blended Agent | Supplier |
|---|---|---|---|---|
| Masterbatch Kneading | SBR | 100 | Base Polymer for feasibility study rubber |  |
|  | N220 Carbon | 20 | Tokai Siest 6 | Tokai Carbon Co., Ltd. |
|  | Silica | 60 | Nipsil AQ | Nippon Silica Industry Co., Ltd. |
|  | Softening Agent | 37.5 | Softening Agent as shown in Table 5 |  |
|  | Silane coupling agent | 6 | Si69 | Degusa Co., Ltd. |
|  | Stearic Acid | 2 | BR-Stearic Acid | Nippon Oils & Fats Co., Ltd. |
|  | Antioxidant | 1 | NOCCLAC6C | Ouchi Shinko Chemical Co., Ltd |
| Final Kneading | Zinc Oxide | 3 | Zinc White No. 1 | Hakusui Chemicals Inc. |
|  | Sulfur | 1.5 | Sulfur | Karuizawa Refinement Co., Ltd. |
|  | Vulcanization accelerator 1 | 1 | NOCCELER DM | Ouchi Shinko Chemical Co., Ltd |
|  | Vulcanization accelerator 2 | 1 | NOCCELER DPG | Ouchi Shinko Chemical Co., Ltd |
|  | Vulcanization accelerator 3 | 1 | NOCCELER NS-F | Ouchi Shinko Chemical Co., Ltd |

Fracture properties, loss properties and wear resistance regarding the rubber composition were evaluated by the foregoing evaluation methods. The physical property values of the rubber compositions in EXAMPLES 13 to 18 were expressed by the index values making the rubber compositions in the corresponding numbers among COMPARATIVE EXAMPLES 13 to 18 as the controls and calculating with fixing the physical property values of the controls as 100. The evaluation results are shown in Table 8.

extended rubber or by adding the softening agent in the step of kneading the rubber.

Further, by comparing EXAMPLE 13 and REFERENCE EXAMPLE 3, it is found that the rubber composition containing silica according to this invention shows superior physical property equivalent to or better than the conventional rubber composition using an aromatic oil.

TABLE 8-1

| Silica/Carbon Black Blended SBR | | | COM. EX. 13 | EX. 13 | REF. EX. 3 | COM. EX. 14 | EX. 14 | COM. EX. 15 | EX. 15 |
|---|---|---|---|---|---|---|---|---|---|
| Composition of Softening Agent | Hydrogenated Naphthenic Oil | SNH46 (phr) | — | — | — | — | — | — | — |
| | | SNH220 (phr) | 18.75 | 18.75 | — | 37.5 | 37.5 | 37.5 | 37.5 |
| | | Aromatic Oil (phr) | 13 | — | 37.5 | — | — | — | — |
| | | Asphalt as shown in Table 2 (phr) | 18.75 | 18.75 | — | 0 | 0 | 0 | 0 |
| Base Polymer | Production Example 1 | SBR-1 (phr) | — | 100 | 100 | — | 100 | — | 100 |
| | Production Example 2 | SBR-2 (phr) | 100 | — | — | 100 | — | 100 | — |
| | Softening Agent Addition Method | | oil ext. | oil ext. | oil ext. | oil ext. | oil ext. | knead | knead |
| | PCA Component in the Softening Agent (DMSO elusion, wt %) | | 1.3 | 1.3 | 15 | 0.1 | 0.1 | 0.1 | 0.1 |
| Vulcanization Rubber | Fracturing Properties | Fracturing Strength @25° C. (Index) | 100 | 104 | 104 | 100 | 109 | 100 | 108 |
| | Loss Property | tan δ @0° C. (Index) | 100 | 108 | 107 | 100 | 104 | 100 | 105 |
| | | tan δ @60° C. (Index) | 100 | 100 | 100 | 100 | 100 | 100 | 100 |
| | Wear Resistance | Lambourne Antiwear Resistance (Index) | 100 | 108 | 109 | 100 | 104 | 100 | 103 |

TABLE 8-2

| Silica/Carbon Black Blended SBR | | | COM. EX. 16 | EX. 16 | COM. EX. 17 | EX. 17 | COM. EX. 18 | EX. 18 |
|---|---|---|---|---|---|---|---|---|
| Composition of Softening Agent | Hydrogenated Naphthenic Oil | SNH46 (phr) | 18.75 | 18.75 | 18.75 | 18.75 | — | — |
| | | SNH220 (phr) | — | — | — | — | 1.5 (4%) | 1.5 (4%) |
| | | Aromatic Oil (phr) | — | — | — | — | — | — |
| | | Asphalt as shown in Table 2 (phr) | 18.75 | 18.75 | 18.75 | 18.75 | 36 (96%) | 36 (96%) |
| Base Polymer | Production Example 1 | SBR-1 (phr) | — | 100 | — | 100 | — | 100 |
| | Production Example 2 | SBR-2 (phr) | 100 | — | 100 | — | 100 | — |
| | Softening Agent Addition Method | | oil ext. | oil ext. | knead | knead | oil ext. | oil ext. |
| | PCA Component in the Softening Agent (DMSO elusion, wt %) | | 1.3 | 1.3 | 1.3 | 1.3 | 0.1 | 0.1 |
| Vulcanization Rubber | Fracturing Properties | Fracturing Strength @25° C. (Index) | 100 | 107 | 100 | 106 | 100 | 99 |
| | Loss Property | tan δ @0° C. (Index) | 100 | 110 | 100 | 109 | 100 | 103 |
| | | tan δ @60° C. (Index) | 100 | 100 | 100 | 100 | 100 | 101 |
| | Wear Resistance | Lambourne Antiwear Resistance (Index) | 100 | 106 | 100 | 105 | 100 | 99 |

According to the results shown in the Tables, the rubber compositions of this invention are particularly superior in all of the fracture properties, the loss properties (at least one characteristic of tangent δ at 0° C. and tangent δ at 60° C.) and the wear resistance particularly when the weight ratio of the (hydrogenated naphthenic oil)/(asphalt) is from 95/5 to 5/95. In addition, by comparing between EXAMPLE 14 and EXAMPLE 15, EXAMPLE 16 and EXAMPLE 17 respectively, it is found that the effect of this invention is obtained either by adding the softening agent to the oil EXAMPLES 19 TO 25, COMPARATIVE EXAMPLES 19 to 25 AND REFERENCE EXAMPLE 4

In accordance with formulations shown in Table 9 below, a BR-based vulcanized rubber composition containing aluminum hydroxide and carbon black in combination was prepared.

TABLE 9

| Mixed Stage | Blending Contents | Parts by wt. | Blended Agent | Supplier |
|---|---|---|---|---|
| Masterbatch Kneading | SBR or BR | 100 | Base Polymer | for feasibility study rubber |
| | N220 Carbon | 75 | Tokai Siest 6 | Tokai Carbon Co., Ltd. |
| | Alminium Hydroxide | 15 | Haidilight H-43M | Shouwa Denko K. K. |
| | Softening Agent | 37.5 | Softening Agent as shown in Table 5 | |
| | Stearic Acid | 1.5 | BR-Stearic Acid | Nippon Oils & Fats Co., Ltd. |
| Final Kneading | Zinc Oxide | 3 | Zinc White No. 1 | Hakusui Chemicals Inc. |
| | Sulfer | 1.8 | Sulfer | Karuizawa Refinement Co., Ltd. |
| | Vulcanization accelerator 1 | 1.5 | NOCCELER DM | Ouchi Shinko Chemical Co., Ltd |
| | Vulcanization accelerator 2 | 0.8 | NOCCELER DPG | Ouchi Shinko Chemical Co., Ltd |

Fracture properties, loss properties and wear resistance regarding the rubber composition were evaluated by the foregoing evaluation methods. The physical property values of the rubber compositions in EXAMPLES 19 to 25 were expressed by the index values making the rubber compositions in the corresponding numbers among COMPARATIVE EXAMPLES 19 to 25 as the controls and calculating with fixing the physical property values of the controls as 100. The evaluation results are shown in Table 10.

and the wear resistance particularly when the weight ratio of the (hydrogenated naphthenic oil)/(asphalt) is from 95/5 to 5/95. Further, by comparing EXAMPLE 19-2 and REFERENCE EXAMPLE 4, it is found that the rubber composition containing aluminum hydroxide according to this invention shows superior physical property equivalent to or better than the conventional rubber composition using an aromatic oil.

TABLE 10-1

| Aluminum Hydroxide/Carbon Black Blended SBR | | | COM. EX. 19 | EX. 19-1 | EX. 19-2 | REF. EX. 4 | COM. EX. 20 | EX. 20 | COM. EX. 21 | EX. 21 |
|---|---|---|---|---|---|---|---|---|---|---|
| Composition of Softening Agent | Hydrogenated Naphthenic Oil | SNH46 (phr) | — | — | — | — | 37.5 | 37.5 | 18.75 | 18.75 |
| | | SNH220 (phr) | 18.75 | 18.75 | 18.75 | — | — | — | — | — |
| | | Aromatic Oil (phr) | — | — | — | 37.5 | — | — | — | — |
| | | Asphalt as shown in Table 2 (phr) | 18.75 | 18.75 | 18.75 | — | 0 | 0 | 18.75 | 18.75 |
| Base Polymer | Production Example 3 | BR-1 (phr) | — | — | 100 | 100 | — | 100 | — | 100 |
| | Production Example 4 | BR-2 (phr) | — | 100 | — | — | — | — | — | — |
| | Production Example 5 | BR-3 (phr) | 100 | — | — | — | 100 | — | 100 | — |
| | Softening Agent Addition Method | | oil ext. | oil ext. | oil ext. | oil ext. | oil ext. | oil ext. | oil ext. | oil ext. |
| PCA Component in the Softening Agent (DMSO elusion, wt %) | | | 1.3 | 1.3 | 1.3 | 15 | 0.1 | 0.1 | 1.3 | 1.3 |
| Vulcanization Rubber | Fracturing Properties | Fracturing Strength @25° C. (Index) | 100 | 105 | 110 | 109 | 100 | 106 | 100 | 110 |
| | Loss Property | tan δ @0° C. (Index) | 100 | 101 | 103 | 103 | 100 | 100 | 100 | 108 |
| | | tan δ @60° C. (Index) | 100 | 104 | 108 | 107 | 100 | 110 | 100 | 100 |
| | Wear Resistance | Lambourne Antiwear Resistance (Index) | 100 | 105 | 115 | 117 | 100 | 110 | 100 | 110 |

TABLE 10-2

| Aluminum Hydroxide/Carbon Black Blended SBR | | | COM. EX. 22 | EX. 22 | COM. EX. 23 | EX. 23 | COM. EX. 24 | EX. 24 | COM. EX. 25 | EX. 25 |
|---|---|---|---|---|---|---|---|---|---|---|
| Composition of Softening Agent | Hydrogenated Naphthenic Oil | SNH46 (phr) | — | — | 1.5 (4%) | 1.5 (4%) | — | — | 1.5 (4%) | 1.5 (4%) |
| | | SNH220 (phr) | 18.75 | 18.75 | — | — | 18.75 | 18.75 | — | — |
| | | Aromatic Oil (phr) | — | — | — | — | — | — | — | — |
| | | Asphalt as shown in Table 2 (phr) | 18.75 | 18.75 | 36 (96%) | 36 (96%) | 18.75 | 18.75 | 36 (96%) | 36 (96%) |
| Base Polymer | Production Example 3 | BR-1 (phr) | — | 100 | — | 100 | — | 100 | — | 100 |
| | Production Example 5 | BR-3 (phr) | 100 | — | 100 | — | 100 | — | 100 | — |
| Softening Agent Addition Method | | | oil ext. | oil ext. | oil ext. | oil ext. | oil ext. | oil ext. | oil ext. | oil ext. |
| PCA Component in the Softening Agent (DMSO elusion, wt %) | | | 1.3 | 1.3 | 0.1 | 0.1 | 1.3 | 1.3 | 0.1 | 0.1 |
| Vulcanization Rubber | Fracturing Properties | Fracturing Strength @25° C. (Index) | 100 | 110 | 100 | 104 | 100 | 109 | 100 | 103 |
| | Loss Property | tan δ @0° C. (Index) | 100 | 103 | 100 | 98 | 100 | 104 | 100 | 98 |
| | | tan δ @60° C. (Index) | 100 | 108 | 100 | 102 | 100 | 109 | 100 | 102 |
| | Wear Resistance | Lambourne Antiwear Resistance (Index) | 100 | 115 | 100 | 104 | 100 | 113 | 100 | 103 |

According to the results shown in the Tables, the rubber compositions of this invention are particularly superior in all of the fracture properties, the loss properties (at least one characteristic of tangent δ at 0° C. and tangent δ at 60° C.)

EXAMPLES 26 TO 33 AND COMPARATIVE EXAMPLE 26

In accordance with formulations shown in Table 11 below, a SBR-based vulcanized rubber composition containing carbon black was prepared.

TABLE 11

| Mixed Stage | Blending Contents | Parts by wt. | Blended Agent | Supplier |
|---|---|---|---|---|
| Masterbatch Kneading | SBR | 100 | Base Polymer for SBR1712 | JSR Co., Ltd. |
| | N220 Carbon | 75 | Tokai Siest 6 | Tokai Carbon Co., Ltd. |
| | Softening Agent | 37.5 | Softening Agent as shown in Table 5 | |
| | Stearic Acid | 1.5 | BR-Stearic Acid | Nippon Oils & Fats Co., Ltd. |

TABLE 11-continued

| Mixed Stage | Blending Contents | Parts by wt. | Blended Agent | Supplier |
|---|---|---|---|---|
| Final Kneading | Zinc Oxide | 3 | Zinc White No. 1 | Hakusui Chemicals Inc. |
| | Sulfur | 1.8 | Sulfur | Karuizawa Refinement Co., Ltd. |
| | Vulcanization accelerator 1 | 1.5 | NOCCELER DM | Ouchi Shinko Chemical Co., Ltd |
| | Vulcanization accelerator 2 | 0.8 | NOCCELER DPG | Ouchi Shinko Chemical Co., Ltd |

Fracture properties, loss properties and wear resistance regarding the rubber composition were evaluated by the foregoing evaluation methods. The physical property values of the rubber compositions in EXAMPLES 26 to 33 were expressed by the index values making the rubber compositions in the corresponding numbers among COMPARATIVE EXAMPLE 26 as the controls and calculating with fixing the physical property values of the controls as 100. The evaluation results are shown in Table 12.

TABLE 12

| | Carbon Black Blended SBR | | COM. EX. 26 | EX. 26 | EX. 27 | EX. 28 | EX. 29 | EX. 30 | EX. 31 | EX. 32 | EX. 33 |
|---|---|---|---|---|---|---|---|---|---|---|---|
| Composition of Softening Agent | Hydrogenated Naphthenic Oil | C in Table 1 (phr) | 0 | 1.5 (4%) | 11.25 | 36 (96%) | 37.5 | — | — | — | — |
| | | D in Table 1 (phr) | — | — | — | — | — | 1.5 (4%) | 13.1 | 36 (96%) | 37.5 |
| | Asphalt as shown in Table 2 (phr) | | 37.5 | 36 (96%) | 26.25 | 1.5 (4%) | 0 | 36 (96%) | 24.4 | 1.5 (4%) | 0 |
| Base Polymer | Production Example 6 | SBR-3 (phr) | 100 | 100 | 100 | 100 | 100 | 100 | 100 | 100 | 100 |
| | Softening Agent Addition Method | | oil ext. | oil ext. | oil ext. | oil ext. | oil ext. | oil ext. | oil ext. | oil ext. | oil ext. |
| | PCA Component in the Softening Agent (DMSO elusion, wt %) | | 0 | 0.1 | 0.5 | 1.7 | 1.8 | 0.1 | 0.9 | 2.4 | 2.5 |
| Vulcanization Rubber | Fracturing Properties | Fracturing Strength @25° C. (Index) | 100 | 99 | 101 | 98 | 98 | 99 | 99 | 98 | 98 |
| | Loss Property | tan δ @0° C. (Index) | 100 | 98 | 93 | 84 | 83 | 95 | 92 | 84 | 83 |
| | | tan δ @60° C. (Index) | 100 | 106 | 122 | 122 | 122 | 122 | 122 | 122 | 122 |
| | Wear Resistance | Lambourne Antiwear Resistance (Index) | 100 | 101 | 111 | 105 | 105 | 102 | 112 | 106 | 105 |

According to the results shown in the Tables, the rubber compositions of this invention using the softening agents with the weight ratio of the (hydrogenated naphthenic oil)/(asphalt) is from 95/5 to 5/95 in EXAMPLES 27 and 31 are superior in all of the fracture properties, the loss properties (at least one characteristic of tangent δ at 0° C. and tangent δ at 60° C.) and the wear resistance and a combination effect of the hydrogenated naphthenic oil and the asphalt is clearly recognized.

INDUSTRIAL APPLICABILITY

According to this invention, by blending a softening agent containing less than 3% by weight of PCA component including hydrogenated naphthenic oil and SBR or BR of a specified microstructure, a rubber composition superior in fracture characteristics, loss characteristic and wear resistance is provided as the foregoing description. In addition, this invention also provides a rubber composition showing equivalent or superior physical property with a conventional rubber composition using an aromatic oil. Therefore, this invention can be applicable to various rubber products, a pneumatic tire and, in particular, a tire tread.

What is claimed is:

1. A rubber composition comprising:
   a softening agent including a hydrogenated naphthenic oil of which an extract quantity of dimethylsulfoxide (DMSO) by IP 346 method is controlled to less than 3% by weight, and blending at least one selected from the group consisting group of (1) a styrene-butadiene copolymer rubber with a bond styrene quantity in molecular of from 10% by weight to 60% by weight and with a vinyl bond quantity of the butadiene part of from 10% to 80% and (2) a butadiene rubber with a cis bond quantity of at least 30%.

2. The rubber composition according to claim 1, wherein said bond styrene quantity in molecular of the styrene-butadiene copolymer rubber is from 20% by weight to 50% by weight.

3. The rubber composition according to claim 1 or claim 2, wherein said vinyl bond quantity of the butadiene part of the styrene-butadiene copolymer rubber is from 10% to 65%.

4. The rubber composition according to claim 1, wherein said cis bond quantity of the styrene-butadiene copolymer rubber is at least 60%.

5. The rubber composition according to claim 1, wherein said hydrogenated naphthenic oil has at least 30% CN of naphthenic hydrocarbon content measured in accordance with ASTM D2140.

6. The rubber composition according to claim 1, wherein said softening agent further contains asphalt with up to 5% by weight of an asphaltene component.

7. The rubber composition according to claim 6, wherein a kinetic viscosity at 120° C. of said asphalt is up to 300 mm²/second.

8. The rubber composition according to claim 6 or claim 7, wherein a blending weight ratio of the hydrogenated naphthenic oil and the asphalt under the expression of (the hydrogenated naphthenic oil/the asphalt) in said softening agent is from 95/5 to 5/95.

9. A tire tread with the use of the rubber composition according to claim 1.

10. A pneumatic tire with the use of the rubber composition according to claim 1.

* * * * *

UNITED STATES PATENT AND TRADEMARK OFFICE
CERTIFICATE OF CORRECTION

PATENT NO. : 6,939,910 B2
DATED : September 6, 2005
INVENTOR(S) : Ryuji Nakagawa It is certified that error appears in the above-identified patent and that said Letters Patent is hereby corrected as shown below:

Title page,
Item [22], PCT Filed, change "Dec. 28, 2000" to -- Dec. 28, 2001 --.

Signed and Sealed this

Twenty-fourth Day of January, 2006

JON W. DUDAS
*Director of the United States Patent and Trademark Office*